(12) United States Patent
Lee et al.

(10) Patent No.: US 9,094,078 B2
(45) Date of Patent: Jul. 28, 2015

(54) METHOD AND APPARATUS FOR REMOVING NOISE FROM INPUT SIGNAL IN NOISY ENVIRONMENT

(75) Inventors: Seung-yeol Lee, Seoul (KR); Sungyub Daniel Yoo, Seongnam-si (KR); Gang-youl Kim, Suwon-si (KR); Sang-yoon Kim, Seoul (KR); Jung-eun Park, Anyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1034 days.

(21) Appl. No.: 12/958,507

(22) Filed: Dec. 2, 2010

(65) Prior Publication Data
US 2011/0142256 A1 Jun. 16, 2011

(30) Foreign Application Priority Data
Dec. 16, 2009 (KR) .................. 10-2009-0125690

(51) Int. Cl.
*G10L 21/0208* (2013.01)
*H04B 1/10* (2006.01)
*G10L 21/0216* (2013.01)

(52) U.S. Cl.
CPC .......... *H04B 1/1036* (2013.01); *G10L 21/0208* (2013.01); *G10L 2021/02165* (2013.01)

(58) Field of Classification Search
CPC .............................. G10L 15/20; G10L 21/02
USPC .................................................. 704/226, 233
See application file for complete search history.

(56) References Cited

U.S. PATENT DOCUMENTS

| 5,680,393 A * | 10/1997 | Bourmeyster et al. ........ 370/286 |
| 5,930,749 A * | 7/1999 | Maes ............................ 704/228 |
| 7,203,640 B2 * | 4/2007 | Murase et al. ................ 704/210 |
| 7,225,001 B1 * | 5/2007 | Eriksson et al. ............. 455/570 |
| 7,590,530 B2 * | 9/2009 | Zhao et al. .................... 704/226 |
| 8,046,219 B2 * | 10/2011 | Zurek et al. ................... 704/233 |
| 8,385,572 B2 * | 2/2013 | Dre.beta.ler et al. ......... 381/317 |
| 8,521,530 B1 * | 8/2013 | Every et al. ................... 704/251 |
| 2002/0186852 A1 * | 12/2002 | Rademacher et al. ....... 381/94.1 |
| 2006/0229869 A1 * | 10/2006 | Nemer .......................... 704/226 |
| 2008/0247577 A1 * | 10/2008 | Dressler et al. .............. 381/317 |

FOREIGN PATENT DOCUMENTS

JP 2004-357821 A 12/2004
KR 10-2006-0066884 A 6/2006

OTHER PUBLICATIONS

Boll, Steven; Suppression of Acoustic Noise in Speech Using Spectral Subtraction; IEEE Transactions on Acoustics, Speech, and Signal Processiong, vol. ASSP.27. No. 2, Apr. 1979. pp. 113-120.*

* cited by examiner

*Primary Examiner* — Abul Azad
(74) *Attorney, Agent, or Firm* — Sughrue Mion, PLLC

(57) ABSTRACT

A method of removing a noise signal from an input signal, the method including receiving a pure noise signal and an input signal including the noise signal; determining whether the pure noise signal is a static noise signal or a non-static noise signal; and removing the noise signal from the input signal according to whether the noise signal is determined to be the static noise signal or the non-static noise signal.

15 Claims, 5 Drawing Sheets

METHOD AND APPARATUS FOR REMOVING NOISE FROM INPUT SIGNAL IN NOISY ENVIRONMENT

CROSS-REFERENCE TO RELATED PATENT APPLICATION

This application claims priority from Korean Patent Application No. 10-2009-0125690, filed on Dec. 16, 2009 in the Korean Intellectual Property Office, the disclosure of which is incorporated herein in its entirety by reference.

BACKGROUND

1. Field

The exemplary embodiments relate to a method and apparatus which remove noise from an input signal in a noisy environment.

2. Description of the Related Art

When a voice signal is received in a noisy environment, a noise signal is received along with the voice signal. Related art methods of removing a frequency spectrum of the noise signal from a frequency spectrum of the voice signal have been used to remove the noise signal received along with the voice signal.

SUMMARY

The exemplary embodiments provide a method and apparatus which remove noise from an input signal in a noisy environment.

According to an aspect of an exemplary embodiment, there is provided a method of removing a noise signal from an input signal, the method including: receiving a pure noise signal and an input signal including the noise signal; determining whether the pure noise signal is a static noise signal or a non-static noise signal; and removing the noise signal from the input signal according to whether the pure noise signal is determined to be the static noise signal or the non-static signal.

The determining may include: calculating a feature vector of the pure noise signal; detecting a similar noise signal having a most similar feature vector to the feature vector of the pure noise signal from a codebook generated using a plurality of feature vectors corresponding to a plurality of noise signals; and determining whether the pure noise signal is a static noise signal or a non-static noise signal, based on the detected similar noise signal.

The feature vector of the pure noise signal may be a linear prediction coefficient (LPC) of the pure noise signal, and the codebook may be generated using LPCs of the plurality of noise signals.

The method may further include: detecting a noise receiving period in which only the pure noise signal is received and an input signal receiving period in which the input signal is received.

The removing the noise signal may include: if the pure noise signal is determined to be the static noise signal, an energy level of the pure noise signal received in a noise receiving period with respect to frequency bands is used to remove the noise signal from the input signal received in the input signal receiving period, wherein the energy level of the pure noise signal with respect to frequency bands is changed to have another value when another pure noise signal is received in the noise receiving period.

The removing of the noise signal may include: calculating the energy level of the pure noise signal received during the noise receiving period with respect to frequency bands; calculating an energy level of the input signal received during the input signal receiving period with respect to frequency bands; and determining a gain of a noise removal filter that is to be used to remove noise from the input signal based on a ratio of the energy level of the pure noise signal with respect to the frequency bands and the energy level of the input signal with respect to the frequency bands.

The removing of the noise signal may include: generating a plurality of frames by dividing the received pure noise signal or the input signal by predetermined units of time; if the received pure noise signal is determined to be the non-static noise signal, considering an energy level of an initially received pure noise signal with respect to frequency bands as an initial value, and calculating an energy level of a noise signal that is to be removed from the input signal with respect to frequency bands for each of the plurality of frames; calculating the energy level of the input signal with respect to frequency bands for each of the plurality of frames; and determining a gain of a noise removal filter that is to be used to remove noise from the input signal based on the calculated energy level of the noise signal that is to be removed from the input signal with respect to frequency bands for each of the plurality of frames and the calculated energy level of the input signal with respect to frequency bands for each of the plurality of frames.

According to an aspect of another exemplary embodiment, there is provided an apparatus which removes a noise signal from an input signal, the apparatus including: a receiving unit which receives a pure noise signal and an input signal including the noise signal; a noise type determining unit which determines whether the pure noise signal is a static noise signal or a non-static noise signal; and a noise removing unit which removes the noise signal from the input signal according to whether the pure noise signal is determined to be the static noise signal or the non-static noise signal.

The noise removing unit may include: an energy level calculating unit which calculates the energy level of the pure noise signal received during the noise receiving period with respect to frequency bands, and calculates an energy level of the input signal received during the input signal receiving period with respect to frequency bands; and a gain determining unit which determines a gain of a noise removal filter that is to be used to remove noise from the input signal based on a ratio of the energy level of the pure noise signal with respect to the frequency bands and the energy level of the input signal with respect to the frequency bands.

The noise removing unit may include: a signal dividing unit which generates a plurality of frames by dividing the received pure noise signal or the input signal by predetermined units of time; an energy level estimating unit which, if the received pure noise signal is determined to be the non-static noise signal, determines an energy level of an initially received pure noise signal with respect to frequency bands as an initial value, and calculates an energy level of a noise signal that is to be removed from the input signal with respect to frequency bands for each of the plurality of frames, and calculates the energy level of the input signal with respect to frequency bands for each of the plurality of frames; and a gain determining unit which determines a gain of a noise removal filter that is to be used to remove noise from the input signal based on the calculated energy level of the noise signal that is to be removed from the input signal with respect to frequency bands for each of the plurality of frames and the calculated energy level of the input signal with respect to frequency bands for each of the plurality of frames.

According to an aspect of another exemplary embodiment, there is provided a computer-readable recording medium having embodied thereon a program for executing a method of removing a noise signal from an input signal, the method including: receiving a pure noise signal and an input signal including the noise signal; determining whether the pure noise signal is a static noise signal or a non-static noise signal; and removing the noise signal from the input signal according to whether the pure noise signal is determined to be the static noise signal or the non-static noise signal.

According to an aspect of another exemplary embodiment, there is provided a method of removing a noise signal from an input signal, the method including: removing the noise signal from the input signal according to whether a pure noise signal received with the input signal is a static noise signal or a non-static noise signal.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

The exemplary embodiments will now be described more fully with reference to the accompanying drawings.

Figure 1:
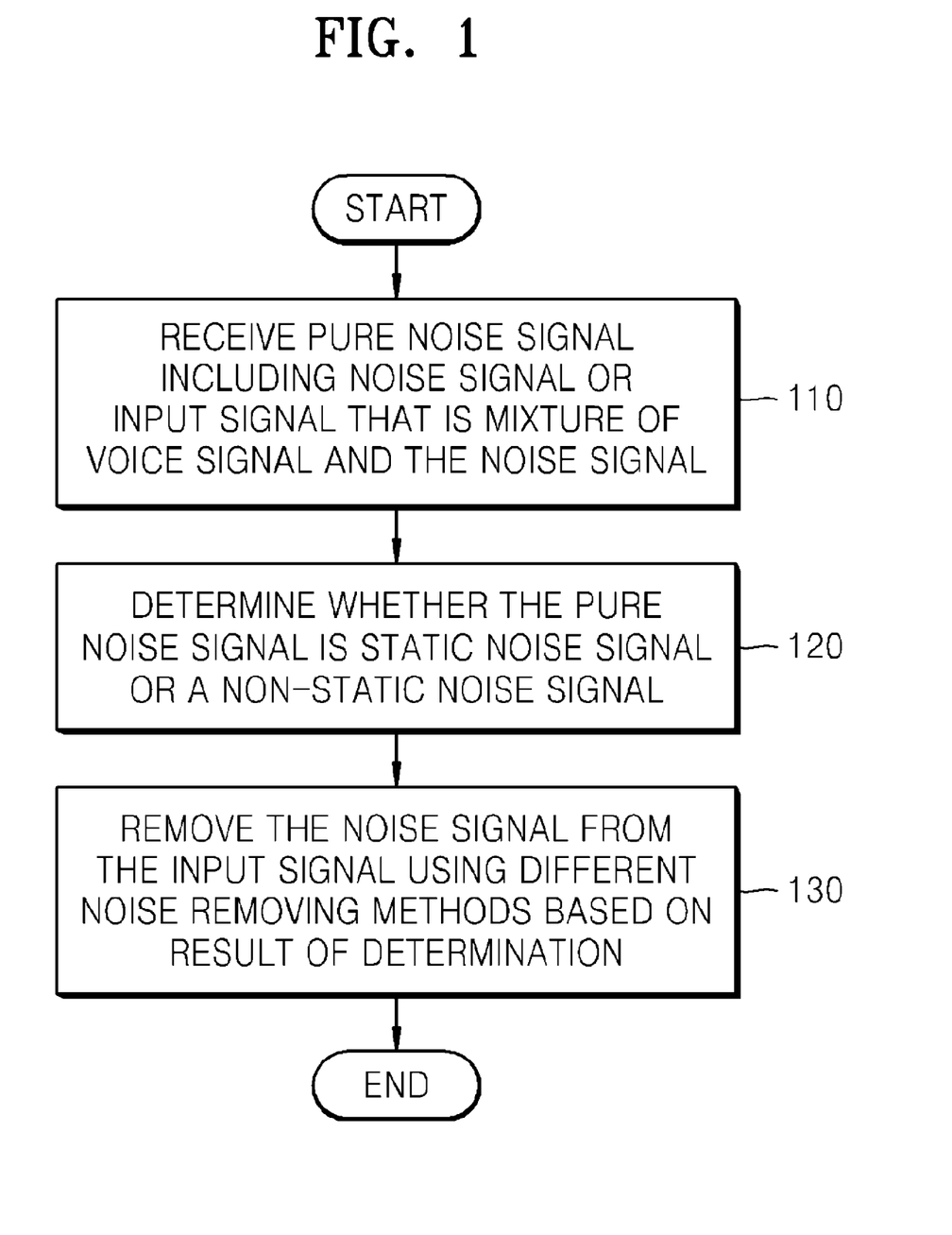
FIG. 1 is a flowchart illustrating a method of removing a noise signal, according to an exemplary embodiment.

FIG. 1 is a flowchart illustrating a method of removing a noise signal, according to an exemplary embodiment. Referring to FIG. 1, in operation 110, a pure noise signal including the noise signal and an input signal that is a mixture of a voice signal and the noise signal is received. In this regard, a signal that is firstly received by a transmitting terminal is the pure noise signal before a user inputs his/her voice to the transmitting terminal. For example, a signal received for the first 10 ms after the transmitting terminal starts a call may be the pure noise signal. Here, a signal received after the first 10 ms may be the input signal that is the mixture of the voice signal and the noise signal.

In operation 120, it is determined whether the pure noise signal is a static noise signal or a non-static noise signal. A static noise is relatively constant irrespective of time, such as noise of vehicles that travel at a constant speed or wind noise, and a non-static noise continuously changes with respect to time (e.g., mixed with noise of people or various noises in restaurants or department stores). Operation 120 will be explained in detail later with reference to FIG. 2.

In operation 130, the noise signal is removed from the input signal by using different noise removing methods based on the result of the determination of operation 120.

In the present embodiment, different noise removing methods are used to remove the noise signal according to whether the pure noise signal is the static noise signal or the non-static noise signal. Accordingly, voice distortion of the voice signal caused by removing the non-static noise that is regarded as the static noise in the related art frequency subtraction method is reduced.

A method of removing the static noise according to an exemplary embodiment will be explained later with reference to FIG. 3. A method of removing the non-static noise according to an exemplary embodiment will be explained later with reference to FIG. 4.

Figure 2:
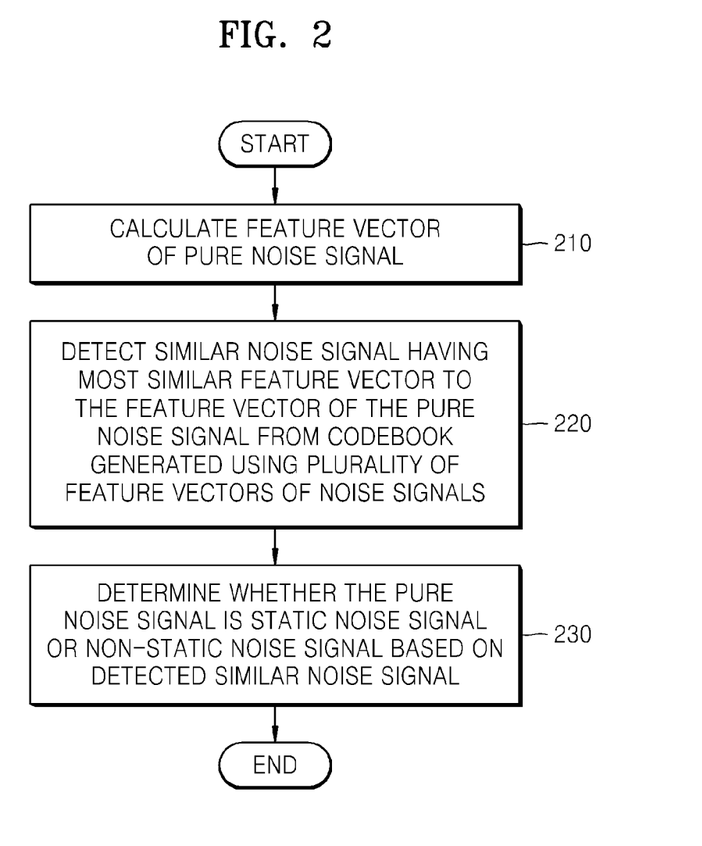
FIG. 2 is a flowchart illustrating a method of determining a type of a noise signal, according to an exemplary embodiment.

FIG. 2 is a flowchart illustrating a method of determining a type of a noise signal, according to an exemplary embodiment. Referring to FIG. 2, in operation 210, a feature vector of a pure noise signal is calculated. A linear prediction coefficient (LPC) of the pure noise signal determined by linear feedback analysis may be used as the feature vector of the pure noise signal.

In operation 220, a similar noise signal having the most similar feature vector to the feature vector of the pure noise signal is detected from a codebook generated using a plurality of feature vectors of noise signals. The codebook may be generated using LPCs of the noise signals.

Various noise signals may be classified into a static noise group and a non-static noise group in the codebook. For example, the static noise group includes a pink noise signal, a white noise signal, a vehicle noise signal, etc., and the non-static noise group includes a babble (speech-like) noise signal, a street noise signal, a music noise signal, etc. In this regard, the feature vectors of the noise signals included in each noise group exhibit various features according to the types of noise signals. In this regard, the noise signals included in the static noise group have similar feature vectors. Likewise, the noise signals included in the non-static noise group have similar feature vectors.

Therefore, even if feature vectors of several hundreds of thousands of noise signals included in the static noise group are detected from the codebook, if the noise signals having similar feature vectors are classified into similar noise types, approximately 200 to 300 feature vectors regarding static noise types may be determined, for example, as representative feature vectors of several hundreds of thousands of noise signals. Furthermore, approximately 200 to 300 feature vectors regarding non-static noise types may be determined, for example, as representative feature vectors of several hundred noise signals by performing the same process as described with respect to the static noise group on several hundreds of thousands of noise signals included in the non-static noise group. However, the number of representative feature vectors is not limited thereto and more than 200 to 300 feature vectors may be determined as representative feature vectors or less than 200 to 300 feature vectors may be determined as representative feature vectors.

By performing the process described above, the codebook is a database generated based on optional numbers of feature vectors regarding the static noise types and the non-static noise types.

As described above, the LPC may be used as a feature vector. The codebook may be generated by dividing a noise signal into predetermined units of time, generating a plurality of frames, extracting a LPC from each frame, and applying a vector quantization method to the extracted LPC for each frame. Furthermore, the similar noise signal having the most similar feature vector to the feature vector of the pure noise signal is detected from the codebook.

In operation 230, it is determined whether the pure noise signal is a static noise signal or a non-static noise signal based on the detected similar noise signal. In more detail, if the similar noise signal is determined as the static noise signal, the currently received pure noise signal is determined as the static noise signal. Conversely, if the similar noise signal is determined as the non-static noise signal, the currently received pure noise signal is determined as the non-static noise signal.

Figure 3:
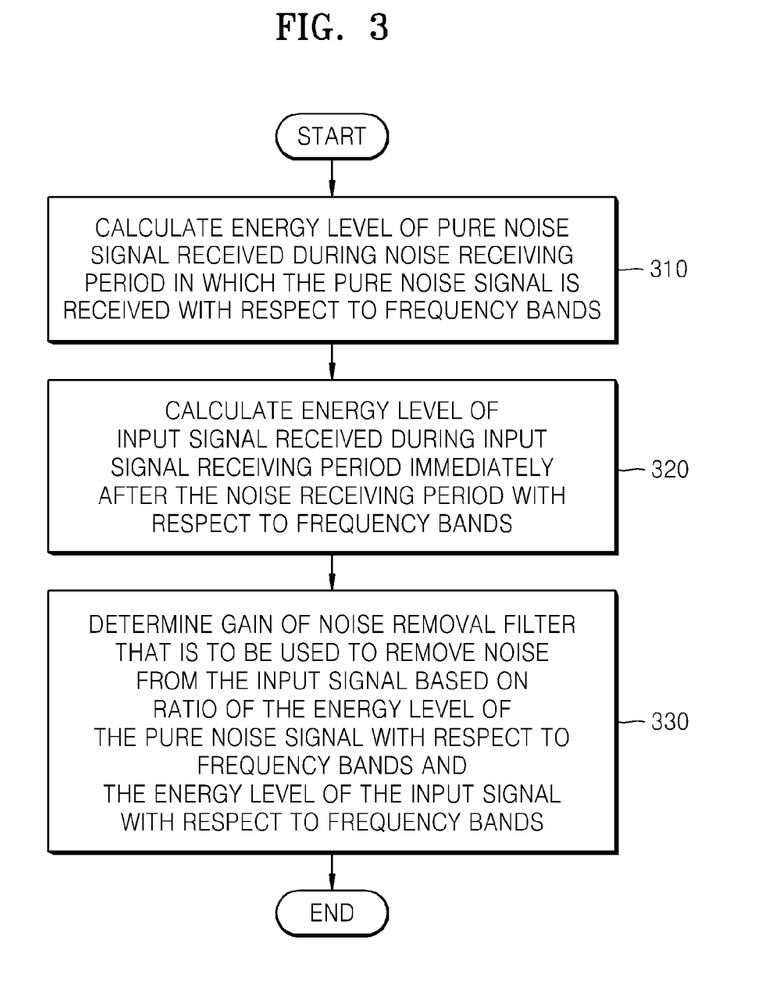
FIG. 3 is a flowchart illustrating a method of removing noise from a pure noise signal that is a static noise signal, according to an exemplary embodiment.

FIG. 3 is a flowchart illustrating a method of removing noise from a pure noise signal that is a static noise signal, according to an exemplary embodiment. Hereinafter, it is assumed that the pure noise signal is received in a noise receiving period and an input signal is received in an input signal receiving period.

Referring to FIG. 3, in operation 310, an energy level of the pure noise signal received during the noise receiving period is calculated with respect to frequency bands. In this regard, the energy level of the pure noise signal with respect to the frequency bands is calculated by converting the pure noise signal into a frequency domain and using a frequency spectrum of the pure noise signal. For example, the frequency bands may be divided in units of 100 Hz, such as 0 Hz~100 HZ, 100 Hz~200 Hz, 200 Hz~300 HZ, etc. However, another exemplary embodiment is not limited thereto and the frequency bands may be divided in units under or over 100 Hz. An operation of converting the pure noise signal into the frequency domain may be performed using fast Fourier transformation (FFT).

According to another exemplary embodiment, an operation of detecting the noise receiving period in which the pure noise signal is received and the input signal receiving period in which the input signal is received may be performed before operation 310 is performed. The noise receiving period and the input signal receiving period may alternate. The input signal receiving period may, though not necessarily, be longer than the noise receiving period.

In operation 320, an energy level of the input signal received during the input signal receiving period immediately after the noise receiving period is calculated with respect to frequency bands. In this regard, the energy level of the input signal with respect to the frequency bands is calculated by converting the input signal into a frequency domain and using a frequency spectrum of the input signal.

In operation 330, a gain of a noise removal filter that is to be used to remove noise from the input signal is determined based on a ratio of the energy level of the pure noise signal with respect to the frequency bands and the energy level of the input signal with respect to the frequency bands.

If the gain of the noise removal filter is determined in operation 330, the determined gain of the noise removal filter is multiplied by the frequency spectrum of the input signal, thereby removing the noise from the input signal.

In more detail, if a signal to noise ratio (SNR) between the energy level of the frequency spectrum of the pure noise signal with respect to the frequency bands and the energy level of the frequency spectrum of the input signal with respect to the frequency bands is high, the frequency spectrum of the input signal is increased by multiplying a high gain by the frequency spectrum of the input signal. Conversely, if the SNR is low, the frequency spectrum of the input signal is reduced by multiplying a low gain by the frequency spectrum of the input signal, thereby improving sound quality of the input signal.

If the input signal having the improved sound quality is generated, the input signal is converted into a time domain, and thus the noise is completely removed from the input signal.

Hereinafter, the method of removing the noise from the static noise signal according to an exemplary embodiment will be described in more detail with reference to Equations 1 through 5. Hereinafter, it is assumed that the pure noise signal and the input signal are divided into a plurality of frames by predetermined units of time.

The energy level $\lambda_k(m+1)$ of the pure noise signal with respect to the frequency bands is calculated by using Equation 1 below:

(noise receiving period):

$$\lambda_k(m+1) = \alpha_n \lambda_k(m) + (1-\alpha_n)|Y_k(m+1)|^2 \qquad \text{[Equation 1]}$$

(input signal receiving period):

$\overline{\lambda_k(m+1)} = \overline{\lambda_k(m)}|$, wherein $Y_k(m+1)$ denotes a frequency spectrum of the input signal in an $m+1^{th}$ frame in a time domain, $\lambda_k(m)|$ and $\lambda_k(m+1)$ denote an energy level of the noise signal of an $m^{th}$ frame and an energy level of the noise signal in the $m+1^{th}$ frame, respectively, k denotes a frequency band, and $\alpha_n$ denotes a smoothing parameter. In this regard, the smoothing parameter $\alpha_n$ and the frequency band may be determined by a user. For example, the smoothing parameter $\alpha_n$ may be determined to be approximate to 1, if k=1, the frequency band k may be a first frequency band corresponding to 0 Hz~100 Hz, if k=2, the frequency band k may be a second frequency band corresponding to 100 Hz~200 Hz, and if k=3, the frequency band k may be a third frequency band corresponding to 200 Hz~300 Hz, etc. However, although the frequency band k is divided in units of 100 Hz, another exemplary embodiment is not limited thereto and the frequency band k may be divided in units under or over 100 Hz.

Meanwhile, according to Equation 1 above, if the $m+1^{th}$ frame corresponds to the noise receiving period, the energy level $\lambda_k(m+1)|$ of the pure noise signal with respect to the frequency bands in the $m+1^{th}$ frame is updated using the energy level $\lambda_k(m)$ of the pure noise signal with respect to the frequency bands in the $m^{th}$ frame and the energy level $|Y_k(m)|^2$ of the input signal with respect to the frequency bands in the $m^{th}$ frame. However, if the $m+1^{th}$ frame corresponds to the input signal receiving period, the energy level $\overline{\lambda_k(m+1)}$ of the pure noise signal with respect to the frequency bands in the $m+1^{th}$ frame is not updated.

As described above, when the $m+1^{th}$ frame corresponds to the input signal receiving period, the energy level $\overline{\lambda_k(m+1)}$ of the pure noise signal with respect to the frequency bands is used as the energy level $\lambda_k(m)|$ of the pure noise signal with respect to the frequency bands in the $m^{th}$ frame since a noise signal is not extracted from the input signal that is a mixture of a voice signal and the noise signal. Thus, the noise signal having the energy level $\lambda_k(m)$ of the pure noise signal with respect to the frequency bands in the $m^{th}$ frame is assumed to be included in the input signal. Thus, an energy level of noise that is to be removed from the input signal in the $m+1^{th}$ frame corresponding to the input signal receiving period is assumed to be the same as the energy level $\lambda_k(m)|$ of the pure noise signal with respect to the frequency bands in the $m^{th}$ frame.

A SNR $\sigma(k)$ with respect to the frequency bands is calculated by using Equation 2 below. The SNR $\sigma(k)$ is calculated in a log scale.

$$\sigma(k) = 10\log_{10}\frac{|Y_k(m)|^2}{\overline{\lambda_k(m)}}, \quad \text{[Equation 2]}$$

wherein $Y_k(m)$ denotes a frequency spectrum of the input signal in the $m^{th}$ frame in the time domain, and $\overline{\lambda_k(m)}|$ denotes the energy level of the noise signal of the $m^{th}$ frame.

If a gain $\overline{\gamma_{ch}}$ of a noise removal filter that is to be used to remove noise from the input signal is calculated in the log scale, a gain $\gamma_{dB}$ of the noise removal filter in the log scale is calculated by using Equation 3 below:

$$\gamma_{db}(k) = \mu(\sigma(k) - \sigma_{th}) + \gamma^n|, \quad \text{[Equation 3]}$$

wherein $\mu$ denotes a gain reflected inclination parameter, and $\sigma_{th}$ denotes a minimum SNR value. The gain reflected inclination parameter $\mu$ and the minimum SNR value $\overline{\sigma_{th}}$ are previously determined. Furthermore, $\gamma^n$ denotes an overall gain representing all frequency bands.

The overall gain $\overline{\gamma^n}$ is calculated by using Equation 4 below $$\overline{\gamma_{db}(k)} = \mu(\sigma(k) - \sigma_{th}) + \gamma^n|, \quad \text{[Equation 4]:}$$

wherein $\gamma_{min}|$ denotes a minimum overall gain value that is previously determined, N denotes the number of frequency bands, and max { } denotes a mathematical symbol indicating that a greater value between values included in a bracket is selected as a result value. In Equation 4 above, a greater value between $\overline{\gamma_{min}}|$ and $$-10\log 10\left(\sum_{k=0}^{N-1}\lambda_k(m)\right)$$

will be selected as the result value.

If the gain $\overline{\gamma_{dB}}|$ of the noise removal filter in the log scale is calculated by using Equations 3 and 4, the gain $\overline{\gamma_{ch}}$ of the noise removal filter is determined by using Equation 5 below:

$$\overline{\gamma_{ch}(k)} = 10^{\gamma_{dB}(k)/20}, \quad \text{[Equation 5]}$$

wherein $\overline{\gamma_{dB}}|$ denotes the gain of the noise removal filter in the log scale, and $\gamma_{ch}|$ denotes the gain of the noise removal filter by converting $\gamma_{dB}$ into a general scale.

Figure 4:
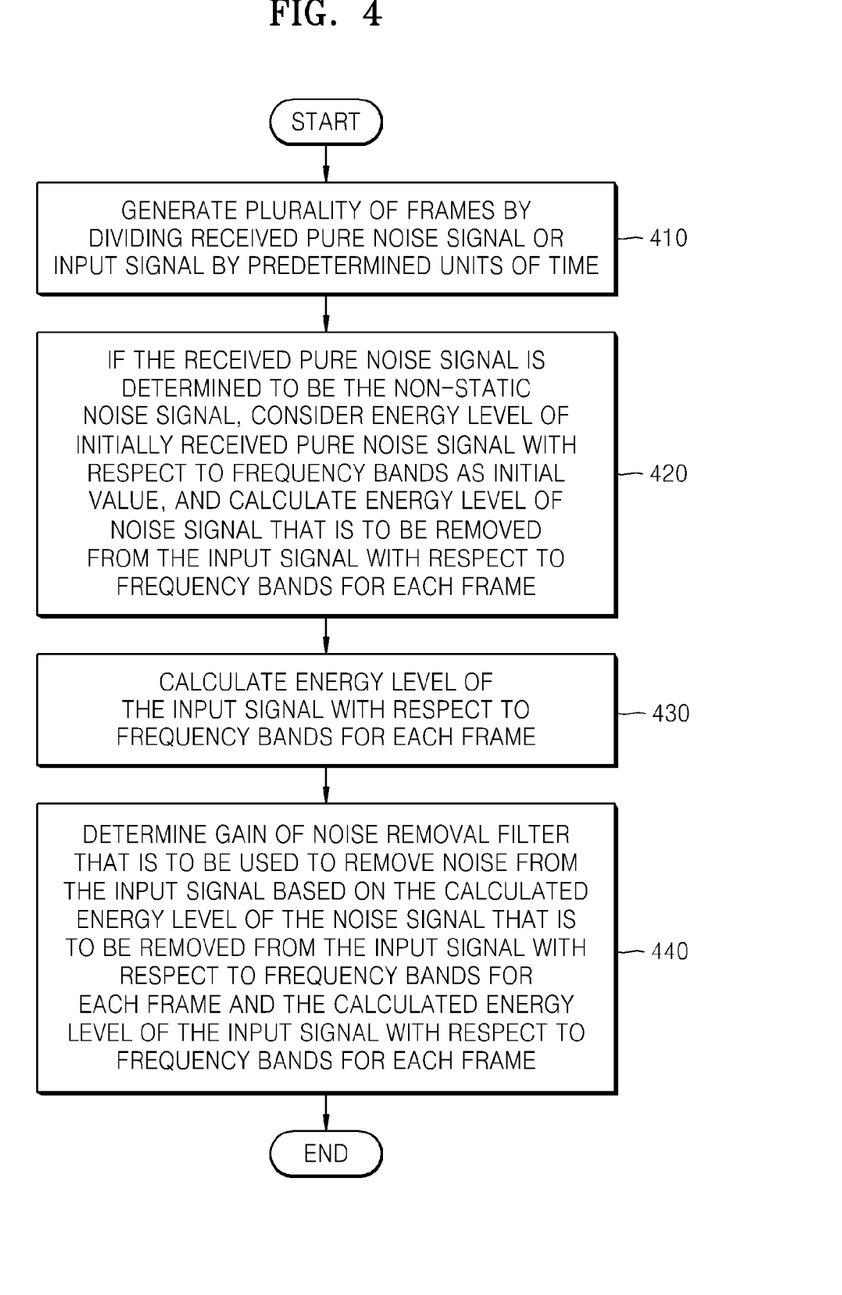
FIG. 4 is a flowchart illustrating a method of removing noise from a pure noise signal that is a non-static noise signal, according to an exemplary embodiment.

Hereinafter, a method of removing noise from a pure noise signal that is a non-static noise signal will be described. FIG. 4 is a flowchart illustrating a method of removing noise from a pure noise signal that is a non-static noise signal, according to an exemplary embodiment.

Referring to FIG. 4, in operation 410, a plurality of frames are generated by dividing a received pure noise signal or an input signal by predetermined units of time.

In operation 420, if the received pure noise signal is determined to be the non-static noise signal, an energy level of an initially received pure noise signal with respect to frequency bands is regarded as an initial value, and an energy level of a noise signal that is to be removed from the input signal with respect to frequency bands is calculated for each frame. In this regard, the energy level of the noise signal that is to be removed from the input signal is based on an assumption that the noise signal is included in the input signal of a current frame.

Since the input signal of the current frame is a mixture of a voice signal and the noise signal, it may not be possible to determine the amount of non-static noise signal included in the input signal of the current frame. Thus, if the energy level of the pure noise signal received in an initial noise receiving period with respect to frequency bands is calculated, the calculated energy level of the pure noise signal is used to calculate an energy level of a noise signal that is assumed to be included in an input signal in an input signal receiving period immediately after the noise receiving period, and the calculated energy level of the noise signal is used to calculate an energy level of a noise signal that is assumed to be included in an input signal in a next input signal receiving period immediately after the input signal receiving period, thus calculating the energy level of the noise signal that is assumed to be included in the input signal of the current frame.

In the exemplary embodiment described with reference to FIG. 3, since the energy level of the pure noise signal with respect to frequency bands is updated for every noise receiving period, the energy level of the pure noise signal with respect to frequency bands is not updated in the input signal receiving period. Meanwhile, in the present exemplary embodiment, since the energy level of the noise signal that is to be removed from the input signal for each frame with respect to frequency bands is updated irrespective of the noise receiving period or the input signal receiving period, the energy level of the noise signal with respect to frequency bands is updated more frequently.

As described above, in the present exemplary embodiment, the energy level of the noise signal with respect to frequency bands is updated more frequently since a non-static noise varies rapidly in order to reduce a distortion that occurs in removing the noise signal from the input signal by continuously estimating a noise in the input signal receiving period.

In operation 430, the energy level of the input signal with respect to frequency bands is calculated for each frame.

In operation 440, a gain of a noise removal filter that is to be used to remove noise from the input signal is determined based on the calculated energy level of the noise signal that is to be removed from the input signal with respect to frequency bands for each frame and the calculated energy level of the input signal with respect to frequency bands for each frame.

If the gain of the noise removal filter is determined in operation 440, the determined gain of the noise removal filter is multiplied by a frequency spectrum of the input signal, and thus the noise is removed from the input signal.

In more detail, if a SNR between the energy level of the pure noise signal with respect to frequency bands and the energy level of the input signal with respect to the frequency bands is high, a frequency spectrum of the input signal is increased by multiplying a high gain by the frequency spectrum of the input signal. Conversely, if the SNR is low, the frequency spectrum of the input signal is reduced by multiplying a low gain by the frequency spectrum of the input signal, thereby improving sound quality of the input signal.

If the input signal having the improved sound quality is finally generated, the input signal is converted into the time domain, and thus the noise is completely removed from the input signal.

Hereinafter, with respect to the method of removing the noise from the non-static noise signal of the present exemplary embodiment described with reference to FIG. 4, a method of calculating a noise removal gain and a method of improving the sound quality of the input signal using the calculated noise removal gain will be described in more detail with reference to Equations 6 through 12.

An energy level $P_k(m)$ of an input signal to which a smoothing operation is applied is calculated by using Equation 6 below:

$$P_k(m) = \alpha_k(m)P_k(m-1) + (1-\alpha_k(m))|Y_k(m)|^2|, \quad \text{[Equation 6]}$$

wherein $|Y_k(m)|^2|$ denotes the energy level of the input signal measured in an $m^{th}$ frame, and $\overline{\alpha_k(m)}|$ denotes an updating rate for performing the smoothing operation in the $m^{th}$ frame. In this regard, when the energy level $P_k(m)$ of the input signal to which the smoothing operation is applied in the $m^{th}$ frame is determined, the greater $\alpha_k(m)$ is, the more the energy level $P_k(m-1)$ of the input signal to which the smoothing operation is applied in an $m-1_{th}$ frame will be reflected. The updating rate $\alpha_k(m)$ for performing the smoothing operation in the $m^{th}$ frame is calculated by using Equation 7 below:

$$\alpha_k(m) = \frac{1}{1+(P_k(m-1)/N_k(m-1)-1)^2},$$ [Equation 7]

wherein $\overline{N_k(m-1)}$ denotes an energy level of the noise signal in the $m-1^{th}$ frame. An estimated value $\hat{N}_k(m-1)$ of the energy level $\overline{N_k(m-1)}|$ of the noise signal in the $m-1^{th}$ frame is calculated by using Equation 8 below. In Equation 7, the estimated value $\hat{N}_k(m-1)$ of the energy level of the noise signal calculated in Equation 8 will replace the energy level $\overline{N_k(m-1)}|$ of the noise signal.

$$\hat{N}_k(m-1)=B_{k,min}(m-1)P_{k,min}(m-1)$$ [Equation 8]

wherein $P_{k,min}(m-1)$ denotes a minimum value of the energy level $P_k(m-1)$ of the input signal to which the smoothing operation is applied in the $m-1^{th}$ frame, which can be obtained by detecting a minimum value of $\overline{P_k(m-1)}|$ in a time period D that is longer than a frame. $\overline{B_{k,min}(m-1)}$ is a correction coefficient multiplied by the energy level $P_k(m-1)|$ of the input signal to which the smoothing operation is applied in the $m-1^{th}$ frame in order to obtain the estimated value $\hat{N}_k(m-1)$ of the energy level of the noise signal in the $m-1^{th}$ frame from the minimum value $P_{k,min}(m-1)$ of the energy level $P_k(m-1)|$ of the input signal to which the smoothing operation is applied in the $m^{th}$ frame.

In this regard, in Equation 8, the minimum value $P_{k,min}(m-1)$ of the energy level $P_k(m-1)|$ of the input signal to which the smoothing operation is applied in the $m-1^{th}$ frame is used to calculate the estimated value $\hat{N}_k(m-1)$ of the energy level of the noise signal in the $m-1^{th}$ frame since a ratio of the noise signal is greater than that of the voice signal in the minimum value $P_{k,min}(m-1)$ of the energy level $P_k(m-1)$ of the input signal to which the smoothing operation is applied, and thus the minimum value $P_{k,min}(m-1)|$ of the energy level $P_k(m-1)$ of the input signal to which the smoothing operation is applied is assumed to be approximate to the energy level $N_k(m-1)|$ of the noise signal. Meanwhile, the correction coefficient $\overline{B_{k,min}(m)}$ is calculated by using Equation 9 below:

$$B_{k,min}(m-1) = 1+(D-1)\frac{2}{\tilde{Q}_{k,eq}(m-1)},$$ [Equation 9]

wherein $\tilde{Q}_{k,eq}(m-1)$ is calculated by using Equation 10 below:

$$\tilde{Q}_{k,eq}(m-1) = \frac{Q_{k,eq}(m-1)-2M(D)}{1-M(D)},$$ [Equation 10]

wherein M(D) is previously determined. $\overline{Q_{k,eq}(m-1)}$ is calculated by using Equation 11 below:

$$Q_{K,eq}(m-1)=2\hat{N}_k(m-2)/varP_k(m-1),$$ [Equation 11]

wherein $\hat{N}_k(m-2)$ denotes an estimated value of an energy level of the noise signal in an $m-2^{th}$ frame, which is obtained by measuring the energy level $\overline{N_k(1)}$ of the noise signal in the first frame, and regarding the measured energy level $N_k(1)|$ of the noise signal as an initial value. Furthermore, $\mathrm{Var}P_k(m-1)$ denotes a variance of averages of the energy levels of the input signals to which the smoothing operation is applied from the first frame to the $m-2^{th}$ frame.

The noise estimation method of Equations 8 through 11 is based on the minimum statistics presented by Rainer Marin, "Noise Power Spectral Density Estimation Based on Optimal Smoothing and Minimum Statistics," IEEE Trans. On Speech and Audio Processing, vol. 9, no. 5, July 2001." Detailed descriptions of Equations 8 through 11 will not be repeated herein.

Next, a posterior SNR $\gamma_k(m)$ and a prior SNR $\xi_k(m)$ used to calculate the gain of the noise removal filter are calculated by using Equations 12 and 13 below:

$$\gamma_k(m) = \frac{|Y_k(m)|^2}{|N_k(m)|^2}$$ [Equation 12]

$$\xi_k(m) = \alpha_x \frac{|G_k(m-1)Y_k(m-1)|^2}{|N_k(m-1)|^2} + (1-\alpha_x)u(\gamma_k(m)-1),$$ [Equation 13]

wherein $G_k(m-1)$ denotes a gain of the noise removal filter in the $m-1^{th}$ frame, and u( ... ) denotes a unit step function. Here, an initial value $G_k(1)$ of the gain of the noise removal filter, an initial value $\gamma_k(1)$ of the posterior SNR, the initial value $\xi_k(1)$ of the prior SNR, and $\alpha_x$ are previously determined.

A gain $G_k(m)$ of the noise removal filter is calculated by using Equations 14 and 15 below:

$$G_k(m) = \frac{\xi_k(m)}{1+\xi_k(m)}\exp\left\{\frac{1}{2}\int_{v_k(m)}^{\infty}\frac{e^{-t}}{t}dt\right\}$$ [Equation 14]

$$v_k(m) = \frac{\xi_k(m)}{1+\xi_k(m)} \cdot \frac{|N_k(m)|^2|X_k(m-1)|^2}{|N_k(m)|^2+|X_k(m-1)|^2},$$ [Equation 15]

wherein $X_k(m-1)$ denotes a frequency spectrum of the input signal from which the noise signal is removed and having improved sound quality in the $m-1^{th}$ frame.

Meanwhile, Equations 14 and 15 are described in detail by Y. Ephraim and D. Malah, "Speech enhancement using a minimum mean-square error log-spectral amplitude estimator," IEEE Trans. on Acoust., Speech, Signal Processing, vol. 33, no. 2, pp. 443-445, April 1985, and thus detailed descriptions thereof will not be repeated here.

Figure 5:
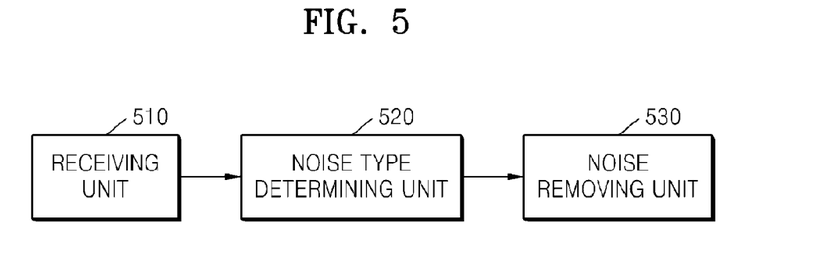
FIG. 5 is a block diagram of an apparatus which removes a noise signal, according to an exemplary embodiment.

FIG. 5 is a block diagram of an apparatus which removes a noise signal, according to an exemplary embodiment. Referring to FIG. 5, the apparatus which removes the noise signal includes a receiving unit 510, a noise type determining unit 520, and a noise removing unit 530.

The receiving unit 510 receives a pure noise signal including the noise signal or an input signal that is a mixture of a voice signal and the noise signal. In general, a firstly received signal may be the pure noise signal.

The noise type determining unit 520 determines whether the noise signal is a static noise signal or a non-static noise signal.

The noise removing unit 530 removes the noise signal from the input signal using different noise removing methods based on whether the noise signal is determined to be the static noise signal or the non-static noise signal.

Figure 6:
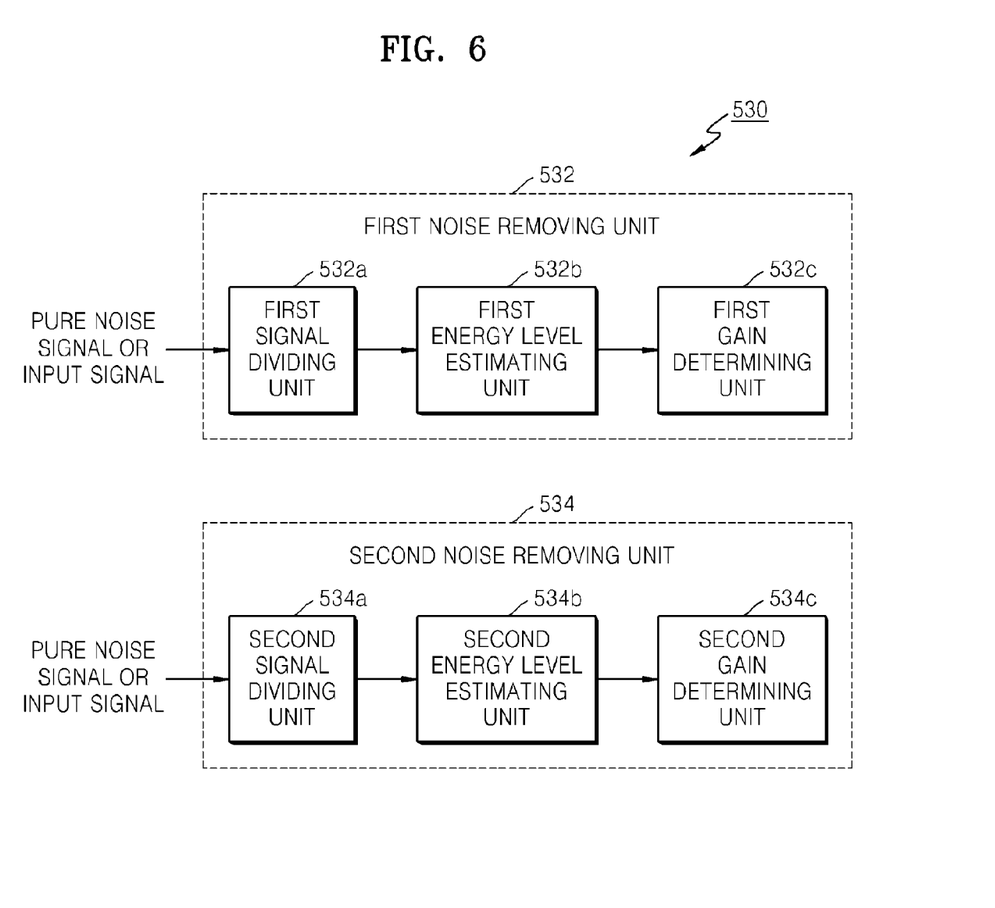
FIG. 6 is a block diagram of a noise removing unit, according to an exemplary embodiment.

FIG. 6 is a block diagram of the noise removing unit 530, according to an exemplary embodiment. Referring to FIG. 6, the noise removing unit 530 includes a first noise removing unit 532 and a second noise removing unit 534.

The operation of the first noise removing unit 532 will now be described. The first noise removing unit 532 operates when the pure noise signal is determined to be a static noise signal, and includes a first signal dividing unit 532a, a first energy level estimating unit 532b, and a first gain determining unit 532c.

The first signal dividing unit 532a divides the pure noise signal or the input signal by predetermined units of time and generates a plurality of frames. However, the first noise removing unit 532 may not include the first signal dividing unit 532a according to another exemplary embodiment.

The first energy level estimating unit 532b calculates an energy level of the pure noise signal received in a noise receiving period with respect to frequency bands and an energy level of the input signal received in an input signal receiving unit with respect to frequency bands.

The first gain determining unit 532c determines a gain of a noise removal filter that is to be used to remove noise from the input signal based on a ratio of the energy level of the pure noise signal with respect to frequency bands and the energy level of the input signal with respect to frequency bands. The first gain determining unit 532c may further generate the input signal having improved sound quality by multiplying the gain of the noise removal filter by a frequency spectrum of the input signal.

The operation of the second noise removing unit 534 will now be described. The second noise removing unit 534 operates when the pure noise signal is determined to be a non-static noise signal and includes a second signal dividing unit 534a, a second energy level estimating unit 534b, and a second gain determining unit 534c.

The second signal dividing unit 534a divides the pure noise signal or the input signal by predetermined units of time and generates a plurality of frames.

The second energy level estimating unit 534b calculates an energy level of the noise signal that is to be removed from the input signal for each frame and an energy level of the input signal with respect to frequency bands for each frame, based on an initial value that is an energy level of a firstly received pure noise signal with respect to frequency bands.

The second gain determining unit 534c determines a gain of a noise removal filter that is to be used to remove noise from the input signal based on the noise signal that is to be removed from the input signal for each frame and the energy level of the input signal with respect to frequency bands for each frame. The second gain determining unit 534c may further generate the input signal having improved sound quality by multiplying the gain of the noise removal filter by a frequency spectrum of the input signal.

Meanwhile, although the noise removal unit 530 is divided into the first noise removing unit 532 and the second noise removing unit 534 in the present exemplary embodiment described with reference to FIG. 6, the noise removing unit 530 may include a signal dividing unit, an energy level estimating unit, and a gain determining unit, and the signal dividing unit, the energy level estimating unit, and the gain determining unit may operate in different ways according to whether a received pure noise signal is a static noise signal or a non-static noise signal according to other exemplary embodiments.

While not restricted thereto, the exemplary embodiments may be written as computer programs and can be implemented in general-use digital computers that execute the programs using a computer-readable recording medium. Examples of the computer-readable recording medium include storage media such as magnetic storage media (e.g., read only memories (ROMs), floppy discs, or hard discs), optically readable media (e.g., compact disk-read only memories (CD-ROMs), or digital versatile disks (DVDs)), etc. Also, the exemplary embodiments may be written as computer programs transmitted over a computer-readable transmission medium, such as a carrier wave, and received and implemented in general-use digital computers that execute the programs. Moreover, while not required in all exemplary embodiments, one or more units of receiving unit 510, the noise type determining unit 520, and the noise removing unit 530 can include a processor or microprocessor executing a computer program stored in a computer-readable medium, such as a local storage or an external storage.

While exemplary embodiments been particularly shown and described above, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method of removing a noise signal from an input signal, which is performed by a processor, the method comprising:
   receiving a pure noise signal and an input signal comprising the noise signal;
   determining whether the pure noise signal is a static noise signal or a non-static noise signal; and
   removing the noise signal from the input signal by using different noise removing methods based on a result of the determining,
   wherein the pure noise signal is a signal which is received at a receiver before the input signal is received, and
   the removing the noise signal comprises:
   if the pure noise signal is determined to be the static noise signal,
      detecting a noise receiving period in which only the pure noise signal is received and an input signal receiving period in which the input signal is received;
      during the noise receiving period, renewing an energy level of the pure noise signal with respect to frequency bands; and
      during the input signal receiving period, removing the noise signal from the input signal received by using the energy level of the pure noise signal with respect to the frequency bands,
   if the pure noise signal is determined to be the non-static noise signal,
      generating a plurality of frames by dividing the received input signal by predetermined units of time;
      considering an energy level of an initially received pure noise signal with respect to frequency bands as an initial value, and calculating an energy level of the noise signal with respect to the frequency bands for each of the plurality of frames; and
      removing the noise signal from the input signal received by using the calculated energy level of the noise signal with respect to the frequency bands for each of the plurality of frames.

2. The method of claim 1, wherein the determining comprises:
- calculating a feature vector of the pure noise signal;
- detecting a similar noise signal having a most similar feature vector to the calculated feature vector of the pure noise signal from a codebook generated using a plurality of feature vectors corresponding to a plurality of noise signals; and
- determining whether the pure noise signal is the static noise signal or the non-static noise signal, based on the detected similar noise signal.

3. The method of claim 2, wherein:
- the feature vector of the pure noise signal is a linear prediction coefficient (LPC) of the pure noise signal; and
- the codebook is generated using LPCs of the plurality of noise signals.

4. The method of claim 1, wherein the pure noise signal is determined to be the static noise signal and the removing the noise signal comprises:
- calculating the energy level of the pure noise signal with respect to the frequency bands, the pure noise signal being received during the noise receiving period;
- calculating an energy level of the input signal with respect to the frequency bands, the input signal received during the input signal receiving period; and
- determining a gain of a noise removal filter that is to be used to remove noise from the input signal based on a ratio of the energy level of the pure noise signal with respect to the frequency bands and the energy level of the input signal with respect to the frequency bands.

5. The method of claim 1, wherein the pure noise signal is determined to be the non-static noise signal and the removing the noise signal further comprises:
- calculating an energy level of the input signal with respect to the frequency bands for each of the plurality of frames; and
- determining a gain of a noise removal filter that is to be used to remove noise from the input signal based on the calculated energy level of the noise signal that is to be removed from the input signal with respect to the frequency bands for each of the plurality of frames and the calculated energy level of the input signal with respect to the frequency bands for each of the plurality of frames.

6. The method of claim 1, wherein the input signal receiving period is immediately after the noise receiving period.

7. The method of claim 1, wherein the input signal is a mixture of a voice signal and the noise signal.

8. A non-transitory computer-readable recording medium having embodied thereon a program for executing the method of claim 1.

9. An apparatus which removes a noise signal from an input signal, the apparatus comprising:
- a receiving unit configured to receive a pure noise signal and an input signal comprising the noise signal;
- a noise type determining unit configured to determine whether the pure noise signal is a static noise signal or a non-static noise signal; and
- a noise removing unit configured to remove the noise signal from the input signal by using different noise removing methods based on a result of a determination of the noise type determining unit,
- wherein the pure noise signal is a signal which is received at the receiving unit before the input signal is received,
- if the pure noise signal is determined to be the static noise signal, the noise removing unit detects a noise receiving period in which only the pure noise signal is received and an input signal receiving period in which the input signal is received, renews an energy level of the pure noise signal with respect to frequency bands during the noise receiving period, and removes the noise signal from the input signal received by using the energy level of the pure noise signal with respect to the frequency bands during the input signal receiving period, and
- if the pure noise signal is determined to be the non-static noise signal, the noise removing unit generates a plurality of frames by dividing the received input signal by predetermined units of time, considers an energy level of an initially received pure noise signal with respect to frequency bands as an initial value, calculates an energy level of the noise signal with respect to the frequency bands for each of the plurality of frames, and removes the noise signal from the input signal received by using the calculated energy level of the noise signal with respect to the frequency bands for each of the plurality of frames.

10. The apparatus of claim 9, wherein the noise type determining unit calculates a feature vector of the pure noise signal, detects a similar noise signal having a most similar feature vector to the calculated feature vector of the pure noise signal from a codebook generated using a plurality of feature vectors corresponding to a plurality of noise signals; and determines whether the pure noise signal is the static noise signal or the non-static noise signal based on the detected similar noise signal.

11. The apparatus of claim 10, wherein:
- the feature vector of the pure noise signal is a linear prediction coefficient (LPC) of the pure noise signal; and
- the codebook is generated using LPCs of the plurality of noise signals.

12. The apparatus of claim 9, further comprising:
- a period determining unit which detects the noise receiving period in which only the pure noise signal is received and the input signal receiving period in which the input signal is received.

13. The apparatus of claim 12, wherein:
- the noise removing unit uses the energy level of the pure noise signal with respect to the frequency bands to remove the nose signal from the input signal received in the input signal receiving period in response to the pure noise signal being determined to be the static noise signal; and
- the energy level of the pure noise signal with respect to the frequency bands is changed to have another value when another pure noise signal is received in the noise receiving period.

14. The apparatus of claim 9, wherein the pure noise signal is determined to be the static noise signal and the noise removing unit comprises:
- an energy level calculating unit which calculates the energy level of the pure noise signal received with respect to the frequency bands, and calculates an energy level of the input signal with respect to the frequency bands, the pure noise signal being received during the noise receiving period and the input signal being received during the input signal receiving period;
- a gain determining unit which determines a gain of a noise removal filter that is to be used to remove noise from the input signal based on a ratio of the energy level of the pure noise signal with respect to the frequency bands and the energy level of the input signal with respect to the frequency bands.

15. The apparatus of claim 9, wherein the received pure noise signal is determined to be the non-static noise signal and the noise removing unit comprises:

a signal dividing unit which generates the plurality of frames by dividing the received input signal by the predetermined units of time;

an energy level estimating unit which considers the energy level of the initially received pure noise signal with respect to the frequency bands as the initial value, calculates the energy level of the noise signal that is to be removed from the input signal with respect to the frequency bands for each of the plurality of frames, and calculates the energy level of the input signal with respect to the frequency bands for each of the plurality of frames; and a gain determining unit which determines a gain of a noise removal filter that is to be used to remove noise from the input signal based on the calculated energy level of the noise signal that is to be removed from the input signal with respect to the frequency bands for each of the plurality of frames and the calculated energy level of the input signal with respect to the frequency bands for each of the plurality of frames.

* * * * *